United States Patent
Kawasaki et al.

(10) Patent No.: US 10,597,301 B2
(45) Date of Patent: Mar. 24, 2020

(54) AMMONIA PRODUCTION METHOD

(71) Applicant: JGC CORPORATION, Yokohama (JP)

(72) Inventors: Tsutomu Kawasaki, Kanagawa (JP); Yoshiyuki Watanabe, Kanagawa (JP)

(73) Assignee: JGC CORPORATION, Yokohama (JP)

( * ) Notice: Subject to any disclaimer, the term of this patent is extended or adjusted under 35 U.S.C. 154(b) by 4 days.

(21) Appl. No.: 16/080,673

(22) PCT Filed: Mar. 3, 2016

(86) PCT No.: PCT/JP2016/056556
§ 371 (c)(1),
(2) Date: Aug. 29, 2018

(87) PCT Pub. No.: WO2017/149718
PCT Pub. Date: Sep. 8, 2017

(65) Prior Publication Data
US 2019/0092645 A1 Mar. 28, 2019

(51) Int. Cl.
*H01M 8/22* (2006.01)
*C01C 1/04* (2006.01)
(Continued)

(52) U.S. Cl.
CPC .......... *C01C 1/0494* (2013.01); *B01D 53/047* (2013.01); *B01D 53/229* (2013.01);
(Continued)

(58) Field of Classification Search
CPC ........ H01M 8/222; H01M 8/225; H01M 8/22; C01C 1/0494; C01C 1/12; C25B 1/00;
(Continued)

(56) References Cited

U.S. PATENT DOCUMENTS

| 7,300,642 B1 * | 11/2007 | Pedersen ............... C01C 1/0488 252/373 |
| 2005/0034479 A1 * | 2/2005 | Ji ........................ B01D 61/362 62/617 |

(Continued)

FOREIGN PATENT DOCUMENTS

| EP | 0962425 | 12/1999 |
| JP | H11292531 | 10/1999 |

(Continued)

OTHER PUBLICATIONS

"Office Action of Australia Counterpart Application," dated May 24, 2019, p. 1-p. 3.
(Continued)

*Primary Examiner* — Raymond Alejandro
(74) *Attorney, Agent, or Firm* — JCIPRNET

(57) ABSTRACT

A high-concentration ammonia production method includes: synthesizing ammonia through electrolysis using water and nitrogen as raw materials; subjecting a resultant generation gas to treatment using an ammonia separation membrane or an ammonia PSA to separate the generation gas into high-concentration ammonia and a residual gas; recycling the residual gas as a nitrogen gas raw material of an ammonia synthesis reactor, and liquefying the high-concentration ammonia recovered through the ammonia separation membrane or the ammonia PSA; and subjecting an unliquefied gas separated from liquefied ammonia to the treatment using the ammonia separation membrane or the ammonia PSA again. According to the present disclosure, ammonia is synthesized by adopting an electrolysis method in which the synthesized ammonia substantially does not contain hydrogen, in combination with ammonia separation and recovery treatment using membrane separation or PSA. With this,
(Continued)

production of liquid ammonia utilizing proton exchange membrane high-concentration ammonia can be synthesized and recovered with high efficiency through an entire process.

6 Claims, 5 Drawing Sheets

(51) Int. Cl.
  *B01D 53/047*   (2006.01)
  *C25B 1/00*     (2006.01)
  *B01D 53/22*    (2006.01)
  *C01C 1/12*     (2006.01)
  *F02C 3/04*     (2006.01)

(52) U.S. Cl.
  CPC ............... *C01C 1/12* (2013.01); *C25B 1/00* (2013.01); *H01M 8/222* (2013.01); *B01D 2253/102* (2013.01); *B01D 2253/108* (2013.01); *B01D 2257/406* (2013.01); *F02C 3/04* (2013.01); *F05D 2210/12* (2013.01)

(58) Field of Classification Search
  CPC ............. B01D 53/047; B01D 53/229; B01D 2253/102; B01D 2253/108; F02C 3/04; F05D 2210/12
  See application file for complete search history.

(56) References Cited

U.S. PATENT DOCUMENTS

2016/0193564 A1* 7/2016 Badwal ............... C01C 1/0411
                                                    423/362
2016/0288114 A1* 10/2016 Way .................... B01J 35/065

FOREIGN PATENT DOCUMENTS

| JP | 2012025985  | 2/2012  |
| JP | 2012184132  | 9/2012  |
| JP | 2013209684  | 10/2013 |
| JP | 2014-40336  | 3/2014  |
| JP | 2014-162662 | 9/2014  |

OTHER PUBLICATIONS

"International Search Report (Form PCT/ISA/210)" of PCT/JP2016/056556, dated Apr. 5, 2016, with English translation thereof, pp. 1-3.

"Search Report of Europe Counterpart Application", dated Oct. 25, 2019, p. 1-p. 5.

* cited by examiner

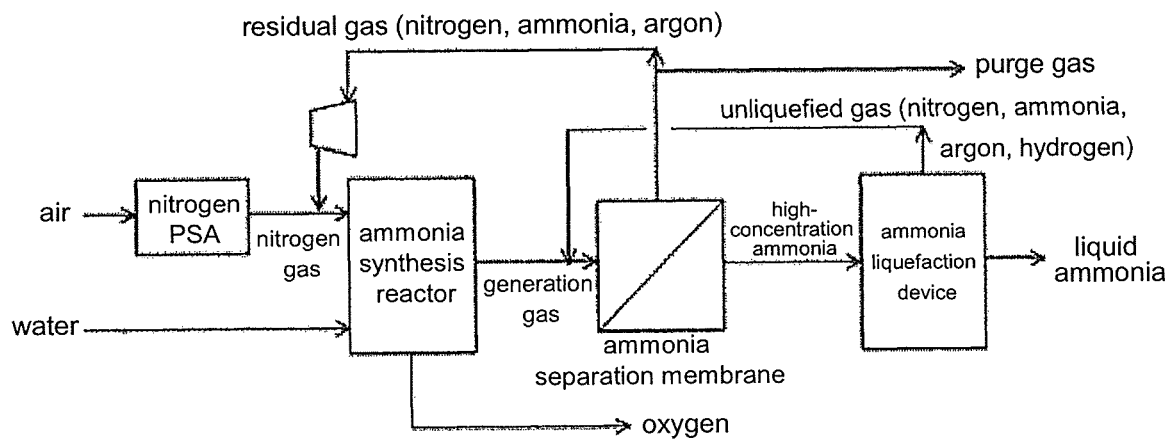
FIG. 1: production of liquid ammonia utilizing proton exchange membrane
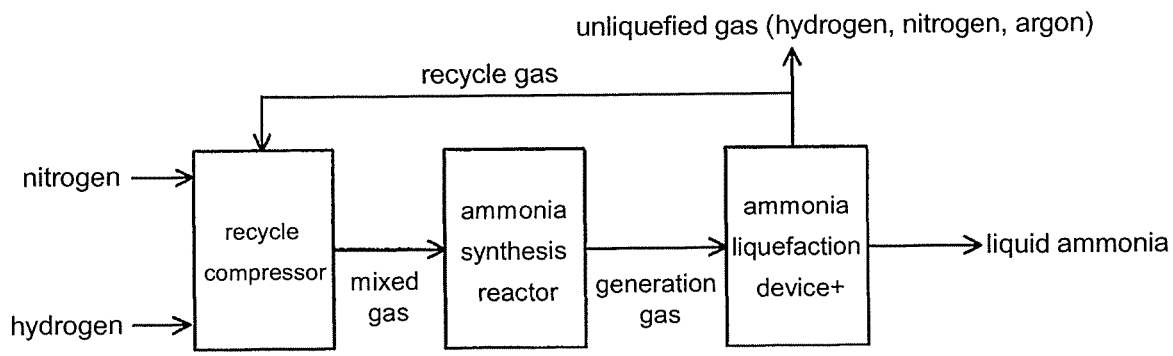
FIG. 2: related art
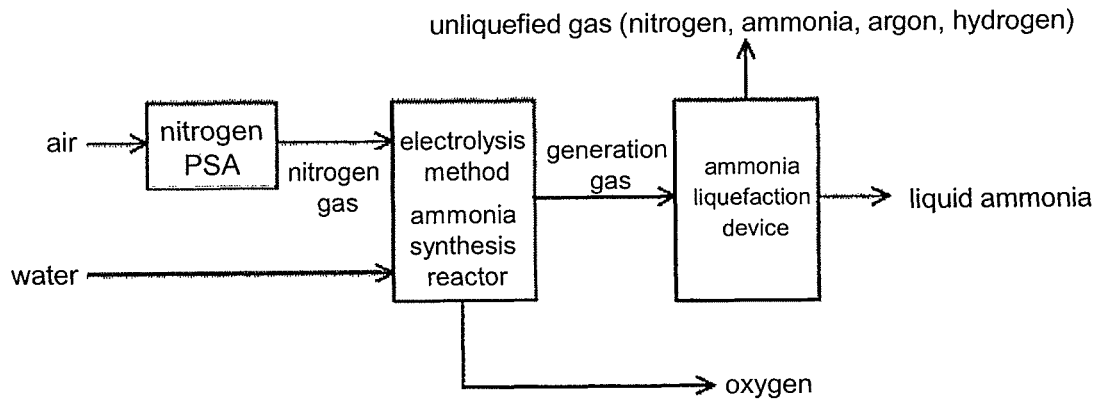
FIG. 3: production of liquid ammonia utilizing liquefaction treatment without separation and condensation treatment (only related art is applied)

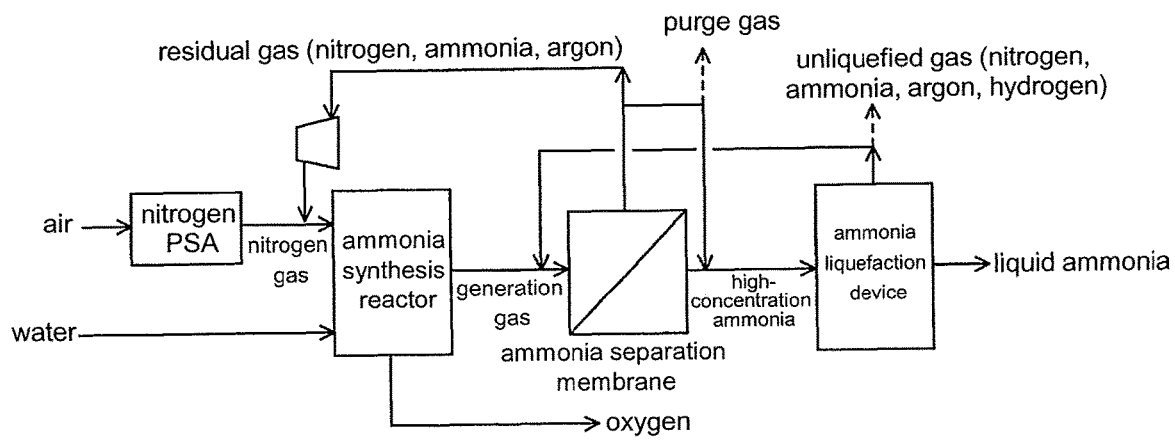
FIG. 4: production of liquid ammonia utilizing proton exchange membrane
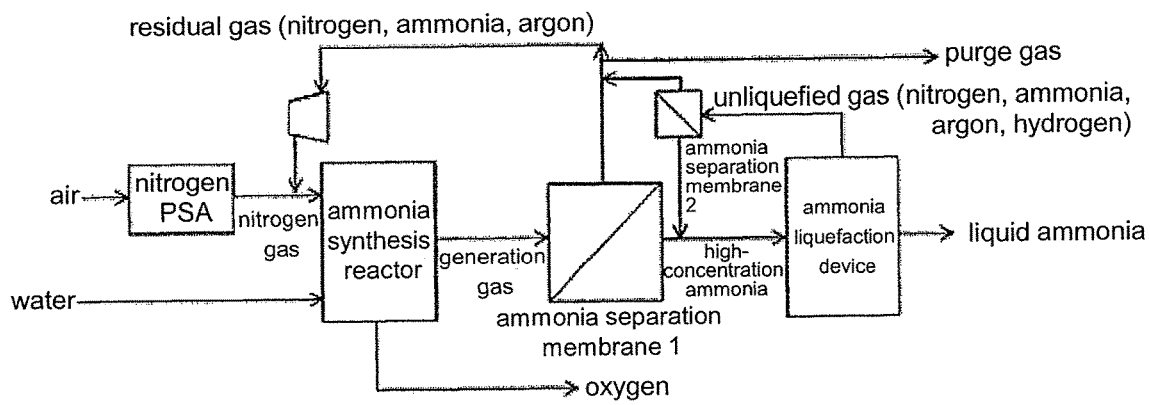
FIG. 5: production of liquid ammonia utilizing proton exchange membrane
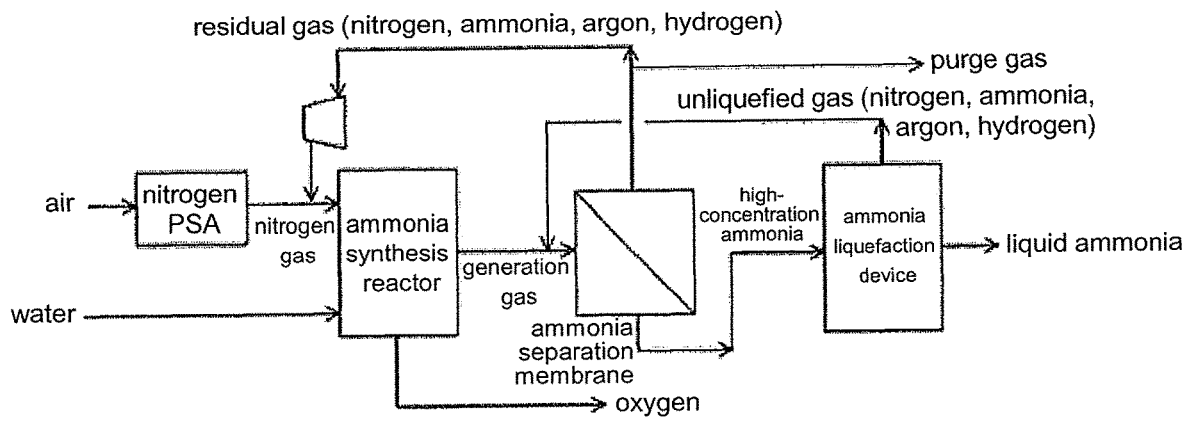
FIG. 6: production of liquid ammonia utilizing proton exchange membrane

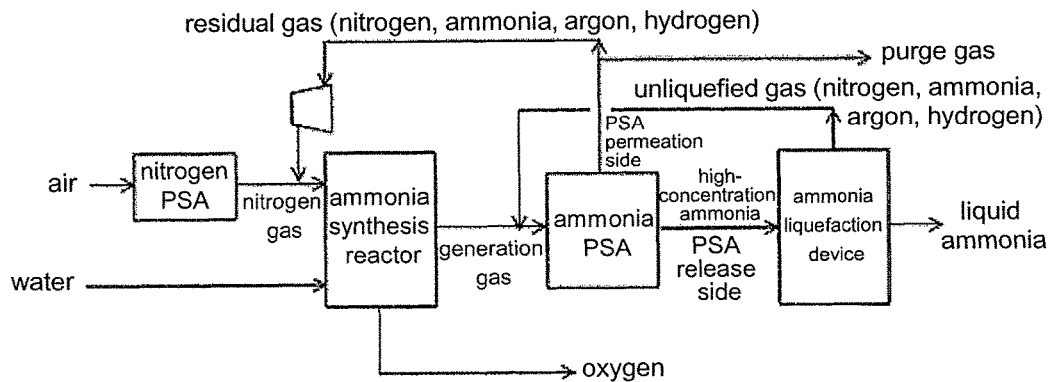
FIG. 7: production of liquid ammonia utilizing proton exchange membrane
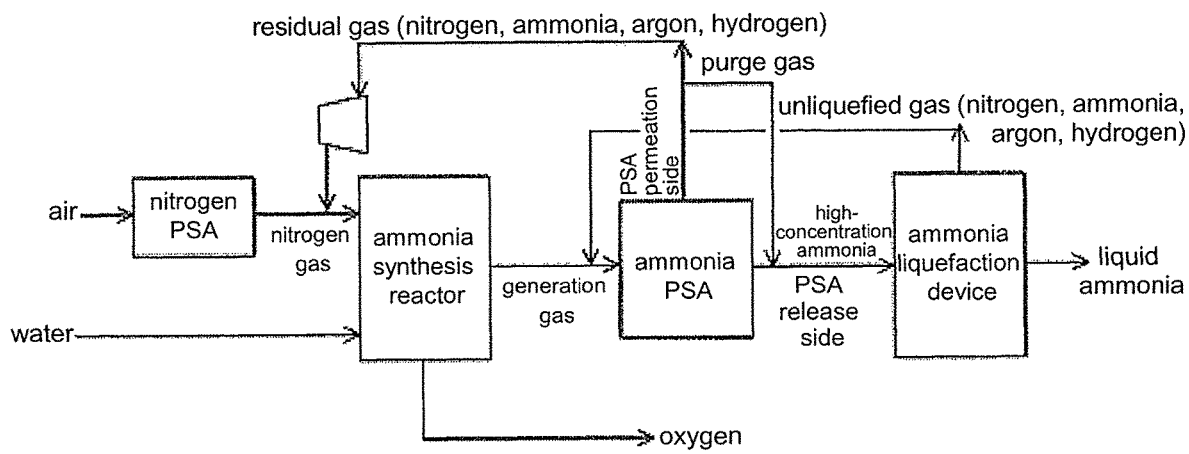
FIG. 8: production of liquid ammonia utilizing proton exchange membrane
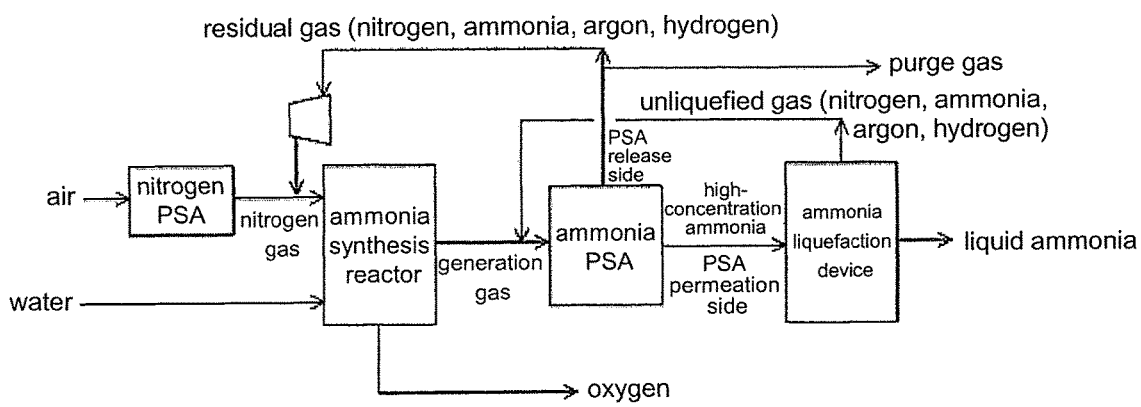
FIG. 9: production of liquid ammonia utilizing proton exchange membrane detail view of production of liquid ammonia utilizing proton exchange membrane (process configuration of FIG. 1)

detail view of production of liquid ammonia utilizing anion exchange membrane (process configuration of FIG. 1)

AMMONIA PRODUCTION METHOD

CROSS-REFERENCE TO RELATED APPLICATION

This application is a 371 application of the international PCT application serial no. PCT/JP2016/056556, filed on Mar. 3, 2016. The entirety of the above-mentioned patent application is hereby incorporated by reference herein and made a part of this specification.

TECHNICAL FIELD

The present invention relates to an industrial ammonia production method involved in an ammonia synthesis process utilizing electrolysis using a nitrogen gas and water as raw materials.

BACKGROUND ART

Ammonia has hitherto been widely produced on an industrial level by the Haber-Bosch process. The Haber-Bosch process involves allowing hydrogen and nitrogen to react with each other at from 400° C. to 600° C. under a high pressure condition of from 20 MPa to 40 MPa through use of a catalyst containing iron as a main component to provide ammonia. As an industrial catalyst, there is used a catalyst in which alumina and potassium oxide are added to iron to improve the catalytic performance of iron. In addition, as another technology, there is an example in which use of a Ru-based catalyst is proposed.

Such related-art ammonia synthesis process is illustrated in FIG. 2. A mixed gas of nitrogen and hydrogen serving as a raw material gas for ammonia is subjected to a reaction in an ammonia synthesis reactor under increased pressure, and an ammonia component is recovered as liquid ammonia from the resultant generation gas. The generation gas contains, as impurities, hydrogen and nitrogen serving as raw materials and argon in addition to ammonia serving as a product. In order to separate those impurities inexpensively, there is a need to separate ammonia through liquefaction at high pressure and low temperature. However, the reaction and the recovery need to be performed under increased pressure, and hence a pressure vessel needs to be designed. Besides, the amount of power to be consumed along with increasing a pressure, increasing a temperature, and cooling is large, and hence enormous energy is consumed. In addition, a fossil fuel, such as a natural gas, is used at the time of production of a hydrogen gas to be used as a raw material, and carbon dioxide, which is said to be responsible for global warming, is discharged. As a result, there is a demand for construction of an energy-saving and environment-friendly process.

In view of the foregoing, as one of new ammonia synthesis methods, attention has been focused on synthesis of ammonia utilizing electrolysis of water. Specifically, there is proposed an ammonia synthesis method involving performing electrolysis by supplying water or water vapor and nitrogen as raw materials.

For example, in JP 2013-209684 A (Patent Literature 1), there is a disclosure of an ammonia electrolytic synthesis method involving using a proton conductive oxide as a solid electrolyte. In addition, in JP 2014-40336 A (Patent Literature 2), there is a disclosure of an ammonia production process involving utilizing a proton exchange membrane as a material for allowing a hydrogen ion to permeate therethrough, using an ionic liquid in which a metallocene complex is dissolved as a catalyst, and applying a predetermined potential between the ionic liquid and water under a state in which the ionic liquid and water are isolated from each other.

In JP 2014-162662 A (Patent Literature 3), there is a proposal of a process in which an ammonia synthesis process and an ammonia separation membrane device configured to separate only an ammonia gas are combined with each other. In Patent Literature 3, there is described that, through application of a membrane separation method, ammonia can be efficiently separated through utilization of the own pressure of a synthesized gas resulting from the synthesis of ammonia, and hence power of a refrigeration system for producing liquefied ammonium can be reduced.

CITATION LIST

Patent Literature

[PTL 1] JP 2013-209684 A
[PTL 2] JP 2014-40336 A
[PTL 3] JP 2014-162662 A

SUMMARY OF INVENTION

Technical Problem

In related-art ammonia synthesis processes including the Haber-Bosch process, a generation gas contains hydrogen and nitrogen serving as raw materials as impurities in addition to ammonia serving as a product. In order to separate those impurities inexpensively, ammonia is generally separated therefrom through liquefaction.

However, a separation and purification step for ammonia in the related-art ammonia production processes including the Haber-Bosch process is not best suited for the new ammonia production process utilizing electrolysis, in which reaction conditions, impurities to be contained, and the like are completely different, and construction of a new entire process is required.

In addition, in Patent Literature 3, there is required a separation membrane which alone is configured to separate almost 100% of ammonia and which allows an unreacted return gas having been subjected to membrane separation to have such a concentration of ammonia that the concentration of ammonia at an inlet of an ammonia synthesis column is preferably 2% or less. Such membrane has problems of, for example, being expensive owing to high technical difficulty, and leakage of an inert component into a high-purity ammonia side.

Solution to Problem

In the ammonia production process utilizing electrolysis, which differs from the related-art synthesis methods performed on an industrial level including the Haber-Bosch process, hydrogen only in an amount required for synthesis of ammonia is supplied through a proton exchange membrane or an anion exchange membrane. Therefore, the ammonia production process utilizing electrolysis has a feature of allowing an operation in which a generation gas hardly contains hydrogen. Besides, the reaction conditions of an ammonia synthesis reaction are generally set to normal temperature and normal pressure unlike the conditions in the related-art methods including the Haber-Bosch process.

Thus, the inventors of the present invention have focused attention on the fact that mainly only nitrogen needs to be separated from ammonia.

An ammonia synthesis gas obtained by the related-art methods including the Haber-Bosch process has the following problems. Even when an attempt is made to use a condensation separation process, such as membrane separation or PSA, it is difficult to separate hydrogen and ammonia from each other when ammonia is to be recovered on a permeation side or a non-adsorption side, and it is also difficult to separate nitrogen and ammonia from each other when ammonia is to be recovered on a non-permeation side or an adsorption side, with the result that the recovery rate of ammonia is extremely reduced. In addition, a gas pressure is reduced owing to adsorption of ammonia, and hence recompression power poses a problem. Therefore, a method such as membrane separation is hardly adopted for the ammonia synthesis gas obtained by the related-art methods.

Moreover, the inventors of the present invention have found that, when an ammonia condensation technology of membrane separation or PSA, which has been abandoned in the related-art ammonia synthesis processes including the Haber-Bosch process, is combined with an electrolysis method and liquefaction treatment, ammonia can be efficiently recovered without applying loads on a facility and energy, and thus completed the present invention.

The present invention has the following feature: through a combination of an electrolysis method, an ammonia separation membrane or PSA, and a liquefaction separation device, a power reduction effect can be obtained even when about 20% of an inert component, such as nitrogen, leaks into an ammonia side through the separation membrane or PSA alone. In the present invention, mixing of the inert component in a high-concentration ammonia side is permitted. Therefore, the present invention has novelty in that a more inexpensive ammonia separation membrane than in, for example, the invention described in Patent Literature 3 can be selected, and besides, a PSA method, in which mixing of the inert component may occur, can be adopted.

In Patent Literature 3, there is disclosed that ammonia is subjected to membrane separation using an ammonia separation membrane in a step prior to liquefaction of ammonia through cooling. However, this is a case in which migration of hydrogen is not considered, and there is no suggestion of its combination with an electrolysis method.

[1] A high-concentration ammonia production method, including:
synthesizing ammonia through electrolysis using water and nitrogen as raw materials;
subjecting a resultant generation gas to treatment using an ammonia separation membrane or an ammonia PSA to separate the generation gas into high-concentration ammonia and a residual gas;
recycling the residual gas as a nitrogen gas raw material of an ammonia synthesis reactor, and liquefying the high-concentration ammonia recovered through the ammonia separation membrane or the ammonia PSA; and
subjecting an unliquefied gas separated from liquefied ammonia to the treatment using the ammonia separation membrane or the ammonia PSA again.

[2] The high-concentration ammonia production method according to Item [1], further including: discharging, as a purge gas, part of the residual gas to be recycled to an outside of a system to suppress condensation of argon; and mixing at least part of the purge gas to be discharged in the high-concentration ammonia recovered through the ammonia separation membrane or the ammonia PSA.

[3] A power generation method, including:
combusting high-concentration ammonia obtained by the method of Item [1] or [2]; and
driving a gas turbine by using a resultant gas as a working medium to generate power.

[4] A high-concentration ammonia use method, including introducing high-concentration ammonia obtained by the method of Item [1] or [2] as a fuel for an ammonia fuel cell.

Advantageous Effects of Invention

According to the present invention, ammonia is synthesized by adopting an electrolysis method in which the synthesis of ammonia does not substantially involve generation of hydrogen, in combination with ammonia separation and recovery treatment using membrane separation or PSA. With this, high-concentration ammonia can be synthesized and recovered with high efficiency through an entire process.

Further, the present invention can adopt a process configuration in which an external heat source is not required, and an operation can be easily performed only by electric power. Therefore, the present invention is highly compatible with renewable energy, such as solar power generation or wind power generation. High-purity ammonia can be easily liquefied, and besides, in recent years, its use as a fuel of a gas turbine for power generation has increasingly been developed. Therefore, such high-purity ammonia can be utilized as storage and transport means as a liquid fuel derived from renewable energy, and has extremely high utilization value.

BRIEF DESCRIPTION OF DRAWINGS

FIG. 1 is a schematic view of one embodiment of an ammonia synthesis process of the present invention.
FIG. 2 is a schematic view of a related-art ammonia synthesis process.
FIG. 3 is a schematic view of one embodiment of an ammonia synthesis process in which related art is applied.
FIG. 4 is a schematic view of one embodiment of the ammonia synthesis process of the present invention.
FIG. 5 is a schematic view of one embodiment of the ammonia synthesis process of the present invention.
FIG. 6 is a schematic view of one embodiment of the ammonia synthesis process of the present invention.
FIG. 7 is a schematic view of one embodiment of the ammonia synthesis process of the present invention.
FIG. 8 is a schematic view of one embodiment of the ammonia synthesis process of the present invention.
FIG. 9 is a schematic view of one embodiment of the ammonia synthesis process of the present invention.

DESCRIPTION OF EMBODIMENTS

Figure 10:
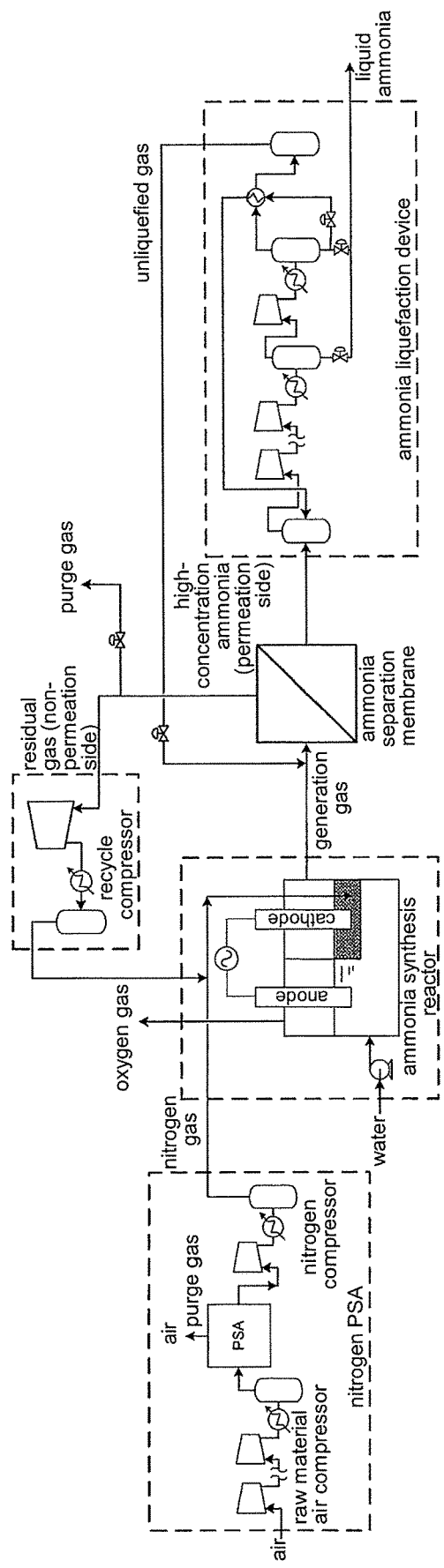
FIG. 10 is a schematic view of one embodiment of the ammonia synthesis process of the present invention.

Typical process configurations of the present invention are illustrated in FIG. 1 and FIG. 7.

In the present invention, ammonia is synthesized through electrolysis using water and nitrogen as raw materials, and then, the resultant generation gas is subjected to treatment using an ammonia separation membrane (FIG. 1) or ammonia PSA (FIG. 7), and the resultant high-concentration ammonia is subjected to liquefaction treatment to produce liquid ammonia. At this time, the treatment on ammonia may be any one of membrane separation using the ammonia separation membrane (FIG. 1) or the ammonia PSA (FIG. 7), or a combination of both the treatments. In the case of the combination of both the treatments, the order of the treatments is not particularly limited.

An ammonia production process utilizing electrolysis, which differs from the related-art ammonia production processes including the Haber-Bosch process, has a feature of allowing an operation in which a generation gas hardly contains a hydrogen gas.

In order to separate and produce ammonia more inexpensively and more efficiently through use of the above-mentioned feature, a membrane separation process or a PSA process, which has hardly been used in the related-art ammonia production processes, is adopted. This is because a generation gas produced through a proton exchange membrane hardly contains hydrogen, and hence high-concentration ammonia can be obtained even through the membrane separation process. However, in the separation of ammonia using membrane separation or PSA, mixing of a certain amount of nitrogen in a high-concentration ammonia side, and in an opposite manner, mixing of a certain amount of ammonia in a residual gas side are inevitable. Therefore, when the synthesis of ammonia using electrolysis and separation and recovery means are combined with each other, a process needs to be constructed in consideration of: a generation gas, reaction conditions, and the like; and the characteristics of the separation and recovery means.

1) Raw Material for Ammonia

In an ammonia synthesis reactor, ammonia is synthesized by allowing nitrogen and water serving as raw materials to react with each other through electrolysis.

Air may be directly utilized as nitrogen to be used as a raw material. In view of efficiency of an ammonia generation reaction, and the fact that impurities contained in air, such as oxygen and carbon dioxide, cause an increase in treatment load on a separation facility at the time of separation and recovery of ammonia, it is preferred to use a nitrogen-containing gas having a nitrogen concentration as high as possible in a raw material stage. Specifically, it is preferred to use a nitrogen-containing gas containing 78 mol % to 100 mol %, preferably 98 mol % to 100 mol % of nitrogen. Any gas inert to the reaction may be contained therein other than nitrogen, and examples thereof include water vapor, hydrogen, argon, and carbon dioxide.

As means for obtaining, from air, the nitrogen-containing gas which is increased in nitrogen concentration, from the viewpoints of power and arrangement cost, it is desired to use any one of a pressure swing adsorption (PSA) method, a temperature swing adsorption (TSA) method, and a pressure and temperature swing adsorption (PISA) method involving using a plurality of adsorption columns arranged in parallel and swinging a pressure, a temperature, and a pressure and a temperature, respectively, to thereby separate and recover nitrogen. Of those, a pressure swing adsorption (PSA) method is most suitable. This is because, in particular, a large device itself has a high heat capacity, and hence the swing of a temperature is difficult in itself. For example, activated carbon, a molecular sieve, or zeolite is packed as an adsorbent. Through utilization of a difference in adsorption speed between oxygen and the like and nitrogen, oxygen and the like are preferentially adsorbed under increased pressure in a short period of time, and thus high-purity nitrogen is efficiently obtained from air. With those separation modes, it is difficult to remove argon contained in air. However, argon can be simply removed with an ammonia liquefaction device in a subsequent stage, and its condensation can be avoided through purging or the like.

In addition, as means for obtaining an ultrahigh-purity nitrogen gas, an air separation device of a cryogenic separation mode may also be utilized. With the air separation device of a cryogenic separation mode, a nitrogen gas free of argon can be obtained.

In the present invention, the nitrogen gas serving as a raw material is desirably supplied after being compressed to a pressure within a range of from 0.1 MPaG to 8 MPaG. 8 MPaG is a pressure to be generally used for liquefaction of ammonia. After liquefaction, a liquid pump, which is more efficient compression means, may be utilized.

2) Synthesis of Ammonia

As an ammonia synthesis reaction utilizing electrolysis, there are given a reaction of a proton exchange membrane mode mediated by $H^+$ and a reaction of an anion exchange membrane mode mediated by $OH^-$. Both the reactions of those modes may be adopted because the reactions are each a reaction in which oxygen is generated on an anode side and ammonia is generated on a cathode side from water and nitrogen as raw materials.

As described above, the use of a reactor in which water is subjected to electrolysis by an electrolysis method, and a generated hydrogen ion and nitrogen are allowed to react with each other to synthesize ammonia is desired because there is no need to set high temperature and high pressure conditions, and hence, reaction conditions not requiring a large amount of energy can be set.

For example, as an example of a reaction device using a proton exchange membrane, there may be given an ammonia production device disclosed in JP 2014-40336 A. Specifically, there is given a reaction device configured to electrochemically synthesize ammonia from a nitrogen gas and water, in which, under a state in which an ionic liquid containing a catalyst and water are partitioned by a proton exchange membrane configured to allow a hydrogen ion (proton) to permeate therethrough without allowing a water molecule to permeate therethrough, nitrogen is introduced into the ionic liquid, and a predetermined potential is applied between the ionic liquid and water, and thus ammonia is electrochemically obtained.

Nitrogen is introduced to a cathode side of the ammonia synthesis reactor. The cathode side is separated from an anode side by the proton exchange membrane or an anion exchange membrane. Water, which is another raw material, is introduced to the anode side of the ammonia synthesis reactor after impurities are removed therefrom with an ion exchange membrane or the like. Through electrolysis, oxygen is generated on the anode side, and hydrogen is supplied to the cathode side through the proton exchange membrane, and thus ammonia is synthesized under the presence of the catalyst.

The ionic liquid is a salt of a cation and an anion in a liquid state at a temperature of less than 100° C. In particular, an ionic liquid in a liquid state at room temperature is preferably used as the ionic liquid. Examples of the cation include quaternary ammonium, quaternary phosphonium, tertiary sulfonium, imidazolium, and pyridinium, and as the anion $A^-$, there may be used, for example, an anion selected from $Cl^-$, $Br^-$, $I^-$, $BF_4^-$, $BF_3C_2F_5^-$, $PF_6^-$, $NO_3^-$, $CF_3CO_2^-$, $CF_3SO_3^-$, $(CF_3SO_2)_2N^-$, $(FSO_2)_2N^-$, $(CN)_2N^-$, $(CF_3SO_2)_3C^-$, $(C_2F_5SO_2)_2N^-$, $AlCl_4^-$, and $Al_2Cl_7^-$. An example of the catalyst is a metallocene complex disclosed in JP 2014-40336 A or JP 2014-40335 A.

For example, Nafion (trademark) NR-212 may be adopted as the proton exchange membrane. In addition, an example of the anion exchange membrane is a membrane made of a hydrocarbon-based polymer.

When the ionic liquid and water are partitioned by the cation exchange membrane, the anion exchange membrane, or the like, decomposition of water owing to contact with the catalyst in the ionic liquid is suppressed. Besides, the permeation of a hydrogen ion is controlled by the proton exchange membrane or the anion exchange membrane, and hence hydrogen does not exist in an excess amount at the time of synthesis of ammonia. Thus, the amount of hydrogen to be contained in an ammonia generation gas can be reduced.

One of the features of the ammonia synthesis reaction using an electrolysis method is that the reaction can be performed at normal temperature, but its operation conditions may be changed within a range of from 1° C. to 300° C. In order to increase an operation temperature, a method involving blowing steam into raw material water may be adopted. The reaction may be performed at normal pressure or at increased pressure. From the viewpoint of a reduction in power, nitrogen and water serving as raw materials are preferably supplied at a higher pressure. The reason for this is as follows: in the reactor, a reaction of $N_2+6H^+ \rightarrow 2NH_3$ occurs, and hence a volume is expanded and approximately doubles in the course of synthesis of an ammonia gas from the nitrogen gas, with the result that a larger amount of compression energy is required. From the viewpoint of consumption energy, it is desired to increase the pressure of nitrogen serving as a raw material, rather than to increase the pressure of synthesized ammonia with a compressor. In addition, also in view of the fact that water, which is the other raw material, can be increased in pressure with a pump, which enables an increase in pressure much more easily than the compressor, it is desired, in an embodiment, to increase a pressure on a raw material side, rather than to increase the pressure of synthesized ammonia.

The pressure of a raw material gas may be increased to a pressure to be generally used at the time of liquefaction of ammonia, while there is a problem of pressure endurance of the reactor. After liquefaction, a liquid pump, which is more efficient compression means, may be utilized. Specifically, nitrogen is preferably supplied after being compressed to a pressure within a range of from 0.1 MPaG to 8 MPaG.

The ammonia production process utilizing an electrolysis method, which differs from the related-art ammonia production processes including the Haber-Bosch process (e.g., FIG. 2), has the following feature: at the time of synthesis of ammonia described above, the generation gas hardly contains a hydrogen gas.

The ammonia generation gas obtained by the electrolysis method contains ammonia, nitrogen, argon contained in raw material nitrogen, and the like, but is substantially free of hydrogen and its concentration is 1 mol % or less. A ratio between nitrogen and ammonia varies depending on reaction conditions and the like, but is appropriately selected in accordance with the concentration of target high-concentration ammonia. In the electrolysis method, the concentration of ammonia in the generation gas is from 1 mol % to 20 mol %.

Meanwhile, in the ammonia production process utilizing an electrolysis method, hydrogen only in an amount required for synthesis of ammonia is supplied through the proton exchange membrane or the anion exchange membrane, and hence the amount of hydrogen in the generation gas can be significantly reduced. Through use of this feature, separation and recovery means, which has not been adopted in conventional ammonia production, can be combined therewith, and thus power required to produce ammonia can be significantly reduced. In addition, even when ammonia needs to be liquefied, ammonia can be liquefied at a lower pressure because ammonia is liquefied after being increased in purity. This leads to an increase in efficiency of the entire process. Further, the reaction is performed at a relatively low temperature, and hence a cooling operation at the time of recovery of high-concentration ammonia is significantly alleviated, with the result that production cost can be reduced.

3) Recovery of Ammonia

The resultant generation gas is subjected to treatment using an ammonia separation membrane or ammonia PSA to recover high-concentration ammonia.

As illustrated in FIG. 3, a process configuration in which liquefaction treatment is performed without the treatment using an ammonia separation membrane or ammonia PSA (a combination of technologies which have hitherto been known) is inefficient because the concentration of ammonia in a generation gas is low, and hence a large amount of energy is required for an ammonia liquefaction step.

Any known separation membrane may be used as the ammonia separation membrane with no particular limitation. Examples of such ammonia separation membrane may include a separation membrane made of a synthetic resin and a carbon separation membrane. Further, other examples of the ammonia separation membrane may include a porous silica membrane and a carbon membrane.

The ammonia separation membrane may be a membrane configured to allow ammonia to permeate therethrough, or a membrane configured to allow nitrogen and the like to permeate therethrough without allowing ammonia to permeate therethrough to provide ammonia as a residual gas.

PSA is an adsorption method involving using a plurality of adsorption columns arranged in parallel and swinging a pressure, to thereby separate and recover a target.

An adsorbent, such as activated carbon or zeolite, is packed in each of the adsorption columns, and ammonia is separated and recovered based on a difference in adsorption capacity depending on a pressure through utilization of fine pores of the adsorbent. In the swing-type adsorption method, a pressure is increased to perform an adsorption step in one column while a pressure is reduced to perform a desorption step in another column. Thus, an adsorption-desorption cycle is repeated in the plurality of columns. Ammonia present in the generation gas is a polar gas, and oxygen and nitrogen, which are main impurities, are non-polar gases, and hence their separation can be easily performed by those methods.

Adsorption of ammonia may be set to be performed on an adsorption side or on a non-adsorption side of each adsorption column, but from the viewpoints of a recovery rate of ammonia and a pressure, adsorption of ammonia is preferably, but not limited to be, set to be performed on the non-adsorption side of those processes.

In this step, the impurities in the generation gas, particularly nitrogen is mainly removed, but carbon dioxide, oxygen, and the like are also removed.

For example, an example in which ammonia is allowed to permeate through an ammonia separation membrane to provide a high-concentration ammonia is illustrated in FIG. 1. A residual gas remaining on the separation membrane contains nitrogen, ammonia not having permeated, and argon serving as an impurity. In addition, an example in which ammonia is adsorbed and then released using ammonia PSA to provide high-concentration ammonia is illustrated in FIG. 7. A residual gas having passed without having been adsorbed in PSA contains nitrogen and ammonia not having been adsorbed. Therefore, in the present invention, the residual gas is recycled as a raw material on a nitrogen side of the ammonia synthesis reactor.

In addition, when the residual gas is recycled in its entire amount, there arises a problem in that impurities, such as argon, derived from air and mixed in from make-up nitrogen are condensed. Therefore, as illustrated in FIG. 1 and FIG. 7, at least a certain amount of the residual gas may be discharged as a purge gas.

With the above-mentioned method of reutilizing the residual gas as a raw material on a nitrogen side of the ammonia synthesis reactor, ammonia in the residual gas is recycled, and hence the yield of ammonia is increased. Besides, the amount of a make-up nitrogen gas is reduced, and hence nitrogen PSA can be reduced in size. In addition, the residual gas obtained through membrane separation or PSA has a higher pressure than nitrogen obtained through nitrogen PSA, and hence also a reducing effect on compression power for the raw material on the nitrogen side can be expected. Thus, there are advantages in terms of the yield of ammonia, the construction cost of nitrogen PSA, and the compression power for raw material nitrogen.

Meanwhile, also the purge gas contains ammonia, though at a low concentration. The purge gas needs to be discharged to an outside of a loop system, but may be mixed on a high-concentration ammonia side, in which high-concentration ammonia is recovered, as illustrated in FIG. 4. With this, while argon is prevented from being condensed, arrangement of an ammonia discharge facility for performing neutralization or the like is not required, and ammonia in the residual gas can be recovered. Such method of mixing the purge gas in the high-concentration ammonia is useful when high-concentration ammonia is utilized as a fuel for an ammonia gas turbine or an ammonia fuel cell in which particularly high-purity ammonia is not required.

In ammonia recovery treatment, operation conditions may be set with no particular limitation as long as the treatment can be performed so that the concentration of ammonia becomes higher than the concentration of ammonia in the generation gas to be loaded to the ammonia separation membrane. However, in consideration of the sizes of an ammonia liquefaction device and a recycle compressor for the residual gas to be arranged in subsequent stages as required, high-concentration ammonia to be separated desirably has a concentration of ammonia of 50 mol % or more. Therefore, as ammonia condensation performance is higher, a more increasing effect on the overall efficiency of the process is obtained.

The resultant high-concentration ammonia may be directly used as a fuel for an ammonia gas turbine or as a fuel for an ammonia fuel cell.

In the present invention, high-concentration ammonia thus separated is subjected to liquefaction treatment. The impurities can be further removed through liquefaction using an ammonia liquefaction device. When high-concentration ammonia turns into liquid ammonia, its portability can be increased.

4) Liquefaction Treatment of Ammonia

In the present invention, high-concentration ammonia having been recovered is liquefied. The liquefaction is performed by temperature reduction or cooling through compression and expansion.

High-purity ammonia discharged from a separation device is introduced into an ammonia liquefaction device. In the ammonia liquefaction device, a temperature is reduced with a heat exchanger by increasing a pressure and then depressurizing and thus utilizing a reduction in temperature caused therethrough, to thereby condense an ammonia component, and liquid ammonia is recovered with a gas-liquid separator. The impurities contained in high-purity ammonia, such as argon and nitrogen, are recovered as an unliquefied gas on a gas side of the gas-liquid separator.

In the ammonia liquefaction device, ammonia is liquefied by being subjected to compression to from about 4 MPaG to about 8 MPaG, and then to a combination of depressurization and a cooling step. As the concentration of ammonia in the raw material gas becomes higher, compression power and cooling energy required for obtaining an equal amount of liquid ammonia in the ammonia liquefaction device become lower.

When the amount of ammonia contained in the unliquefied gas is large, the yield amount of ammonia is reduced. Therefore, in general, there is adopted such an operation method that the pressure of the liquefaction device is increased or the temperature of the liquefaction device is reduced to the extent possible so that the concentration of ammonia in the unliquefied gas is reduced. For example, when a gas pressure to be applied to the liquefaction device is about 8 MPaG, liquefaction is performed by reducing an operation temperature of the liquefaction device within a range of from −30° C. to −35° C.

Examples of the ammonia liquefaction device include a compressor system configured to compress high-concentration ammonia and an ammonia liquefaction device configured to liquefy ammonia through cooling with a refrigerant. Ammonia itself may be used as the refrigerant. In addition, the ammonia liquefaction device may include a refrigeration facility configured to supply a refrigerant, an ammonia storage tank configured to store liquefied ammonia, and the like.

The unliquefied gas is subjected to the treatment using an ammonia separation membrane or PSA again. When the unliquefied gas is recycled in its entire amount, in general, there arise problems in that the impurities are condensed and a power loss is generated through recompression of low-concentration ammonia. Therefore, a method of recycling the unliquefied gas in its entire amount is not generally adopted. However, it is acceptable to increase the concentration of ammonia in the unliquefied gas to a level of the concentration of ammonia in the generation gas from the ammonia synthesis reactor by daringly increasing the operation temperature of the ammonia liquefaction device or reducing the pressure of the ammonia liquefaction device, and to subject the unliquefied gas to the treatment using an ammonia separation membrane or ammonia PSA again.

With such configuration, operation power for the ammonia liquefaction device can be significantly reduced. In addition, the condensation of the impurities can be prevented through the ammonia separation membrane or ammonia PSA, and as a result of the prevention of the condensation of the impurities, a loss of compression power can be reduced to the minimum. In addition, when a method of reutilizing the residual gas remaining on the ammonia separation membrane as the raw material on the nitrogen side is combined, also the yield amount of liquid ammonia can be increased.

In addition, it is also appropriate that the unliquefied gas be not returned to the ammonia separation membrane or ammonia PSA and be subjected to another treatment using a separately arranged small ammonia separation membrane or small ammonia PSA unit for recycle as illustrated in, for example, FIG. 5, and an ammonia component be allowed to join the high-concentration ammonia and a residual gas be reutilized as the raw material on the nitrogen side.

Exemplary Embodiments

An example of a typical process configuration of the present invention is illustrated in FIG. 1. Illustrated in FIG. 1 is a schematic view of a series of steps involving synthesizing ammonia through electrolysis using water and nitrogen as raw materials, and thereafter subjecting the resultant generation gas to treatment using an ammonia separation membrane to produce high-concentration ammonia, and liquefying high-concentration ammonia on a permeation side with a liquefaction device, to thereby produce liquid ammonia.

Nitrogen to be used as a raw material is a nitrogen gas purified from air through nitrogen PSA. The nitrogen gas obtained through nitrogen PSA is introduced into a cathode side of an ammonia synthesis reactor of a proton exchange membrane mode after being increased in pressure to 1 MPaG. The cathode side is separated from an anode side by a proton exchange membrane. Water, which is another raw material, is introduced into the anode side of the ammonia synthesis reactor of a proton exchange membrane mode after impurities are removed therefrom with an ion exchange membrane. In the ammonia synthesis reactor of a proton exchange membrane mode, through electrolysis, oxygen is generated on the anode side, and hydrogen is supplied to the cathode side through the proton exchange membrane and ammonia is synthesized with a catalyst loaded on the cathode side. Impurities are removed from the generation gas obtained in the ammonia synthesis reactor of a proton exchange membrane mode with the ammonia separation membrane to provide high-concentration ammonia. Also high-concentration ammonia contains a nitrogen gas and argon at certain concentrations. Next, liquid ammonia is recovered by liquefying high-concentration ammonia with the ammonia liquefaction device. In addition, a residual gas separated with the ammonia separation membrane is recycled as a raw material on a nitrogen side of the ammonia synthesis reactor. In addition, an unliquefied gas recovered from the liquefaction device is fed to the ammonia separation membrane and subjected to separation treatment again together with the generation gas.

For liquid ammonia synthesized with the process configuration according to the present invention, comparison in production amount and consumption power amount is shown in Table 1.

In FIG. 1, the ammonia synthesis reactor uses a proton exchange membrane. Water is introduced through the proton exchange membrane, and a reaction temperature was set to 30° C. In addition, the nitrogen gas is introduced at a pressure of 1 MPa through nitrogen PSA, and high-concentration ammonia is liquefied by being compressed to 8 MPa (temperature: −30° C.) in the liquefaction device.

The comparison is performed by using as a base an embodiment illustrated in FIG. 3 in which a proton exchange membrane is used, and liquefaction treatment is performed without performing ammonia separation treatment. The gas composition of each stream in the embodiment illustrated in FIG. 3 is shown in Table 2, and the gas composition of each stream in the embodiment of the present invention illustrated in FIG. 1 is shown in Table 3.

The process configuration as illustrated in FIG. 3 as an extension of a related-art ammonia production technology is inefficient because a large amount of energy is required for an ammonia liquefaction step. As shown in Table 1, the adoption of the process configuration of FIG. 1 provides an effect of reducing consumption power by about 80% and an effect of increasing production of liquid ammonia by about 15% as compared to the related art. This is because, even when an increase in concentration of ammonia in the unliquefied gas is permitted as shown in Table 3, such increase does not affect a loss of product ammonia, and as a result, energy required for the ammonia liquefaction device can be significantly reduced. In addition, an operation temperature of the ammonia liquefaction device may be set to normal temperature or more, and hence it is also acceptable to perform cooling to from about 40° C. to about 50° C. with an air cooling device, compress part of liquid ammonia serving as a product with an ammonia pump, and then reduce the pressure of the part of liquid ammonia to rapidly expand the liquid ammonia, to thereby obtain cold heat, and cover energy required for the liquefaction by the cold heat. Ammonia utilized for utilizing the cold heat is reutilized as a raw material for liquid ammonia by being introduced into the ammonia liquefaction device again. With such configuration, the ammonia liquefaction device can be operated without an external cold heat source, and hence a reducing effect on facility cost can be expected.

In addition, when the residual gas is recycled in its entire amount, there arises a problem in that the impurities, such as argon, mixed in from make-up nitrogen are condensed. Therefore, a certain amount of the residual gas needs to be purged.

Illustrated in FIG. 4 is a process configuration in which, in the process configuration of FIG. 1, a purge gas to be discharged to an outside of a system is recycled on a high-concentration ammonia side after treatment using an ammonia separation membrane so that ammonia in the purge gas is recovered while the impurities, such as argon, are prevented from being condensed.

With the process configuration of FIG. 4, the yield amount of liquid ammonia can be further increased, but the amount of the impurities in high-concentration ammonia is increased, with the result that energy required for the ammonia liquefaction device is increased. Accordingly, out of the process configuration of FIG. 1 and the process configuration of FIG. 4, a more competitive one may be selected in view of an application location of the present invention and a market price through comparison of the market price of liquid ammonia and a power price.

The configuration of FIG. 1 includes a step of subjecting the unliquefied gas from the ammonia liquefaction device to the treatment using an ammonia separation membrane again. In FIG. 1, a configuration in which the unliquefied gas is recycled through the same ammonia separation membrane is adopted. However, the same effect is obtained when a configuration as illustrated in FIG. 5 in which a small ammonia separation membrane for recycle is separately prepared is adopted.

The unliquefied gas from the ammonia liquefaction device also contains a certain amount of ammonia. In general, when ammonia in the unliquefied gas is discharged to an outside of a system, the production amount of product ammonia is reduced accordingly. Therefore, in the ammonia liquefaction device, in order to increase the amount of ammonia to be liquefied and thus increase the yield amount of product ammonia to the extent possible, high-concentration ammonia is treated at a higher pressure and a lower temperature to reduce the concentration of ammonia in the unliquefied gas. When the unliquefied gas is reutilized as a raw material gas as in the process configurations of FIG. 1 and FIG. 4, a loss of ammonia can be reduced even when the concentration of ammonia in the unliquefied gas is increased.

When such recycling is performed in conventional ammonia production, the impurities are condensed in high-concentration ammonia serving as a raw material of the ammonia liquefaction device. Therefore, the adoption of such recycling offers no economic advantage. As in the present invention, when the unliquefied gas is subjected to the treatment using an ammonia separation membrane again, the production amount of ammonia can be increased. When both the recycling of the residual gas from the ammonia separation membrane and the recycling of the unliquefied gas from the ammonia liquefaction device in FIG. 1 are adopted, the condensation of the impurities in the system can be prevented by purging part of the residual gas as illustrated in FIG. 1 or discharging part of the unliquefied gas to the outside of the system without recycling (not shown).

Illustrated in FIG. 6 is a case in which an ammonia separation membrane configured to provide high-concentration ammonia on a non-permeation side of the membrane is selected. In this case, nitrogen and argon permeate therethrough to form a residual gas, and high-concentration ammonia is obtained on the non-permeation side. The gas composition of each stream in an embodiment of FIG. 6 is shown in Table 4.

As shown in Table 1, in the embodiment of FIG. 6, power of a recycle compressor is increased, and consumption power per 1 mole of product liquid ammonia is slightly increased. This seems to be because of the following: simultaneously with high-concentration ammonia obtained on the non-permeation side, a larger amount of argon is distributed on the non-permeation side and is condensed in the ammonia liquefaction device, and as a result, a large amount of cooling energy is required; and besides, the residual gas is obtained on a permeation side, and as a result, the recycle compressor requires a larger amount of compression power.

Therefore, when the ammonia separation membrane configured to provide high-concentration ammonia on the non-permeation side of the ammonia separation membrane is adopted, there is no need to perform purging because condensation of argon hardly occurs on a residual gas side.

Accordingly, depending on operation conditions, it is desired in terms of production efficiency of ammonia to select the ammonia separation membrane so that high-concentration ammonia is discharged on the permeation side of the ammonia separation membrane.

TABLE 1

Adoption of ammonia separation membrane as separation and condensation means

| | | Configuration reference FIG. | | |
|---|---|---|---|---|
| | | FIG. 3 | FIG. 1 | FIG. 6 |
| Comparison in production amount of liquid ammonia | [%] | 100 (BASE) | 115.4 | 115.9 |
| Comparison in consumption Total power | [%] | 100 (BASE) | 19.8 | 35.9 |
| Nitrogen PSA | [%] | 48.4 | 8.3 | 8.2 |
| Ammonia liquefaction device | [%] | 51.6 | 9.0 | 15.2 |
| Recycle compressor | [%] | — | 2.5 | 12.5 |
| Comparison in consumption power per 1 kmol of liquid ammonia | [%] | 100 (BASE) | 17.2 | 31.0 |

TABLE 2

Composition of each stream in FIG. 3 (example of related art)

| Stream name | Nitrogen gas | Generation gas | Unliquefied gas | Liquid ammonia |
|---|---|---|---|---|
| Pressure [MPaG] | 1.00 | 0.95 | 8.00 | 3.00 |
| Composition [dry-mol %] | | | | |
| $N_2$ | 98.8 | 83.5 | 96.2 | |
| Ar | 1.2 | 1.1 | 1.3 | |
| $NH_3$ | — | 15.4 | 2.5 | 100 |

TABLE 3

Composition of each stream in FIG. 1 (example of ammonia separation membrane)

| Stream name | Nitrogen gas | Generation gas | Residual gas | High-concentration ammonia | Unliquefied gas | Liquid ammonia |
|---|---|---|---|---|---|---|
| Pressure [MPaG] | 1.0 | 1.0 | 0.8 | 0.5 | 1.0 | 3.0 |
| Composition [dry-mol %] | | | | | | |
| $N_2$ | 98.8 | 82.6 | 93.7 | 24.8 | 82.3 | — |
| Ar | 1.2 | 2.4 | 2.7 | 0.7 | 2.4 | — |
| $NH_3$ | — | 15.0 | 3.6 | 74.5 | 15.3 | 100.0 |

TABLE 4

Composition of each stream in FIG. 6 (example of ammonia separation membrane)

| Stream name | Nitrogen gas | Generation gas | Residual gas | High-concentration ammonia | Unliquefied gas | Liquid ammonia |
|---|---|---|---|---|---|---|
| Pressure [MPaG] | 1.00 | 0.95 | 0.50 | 0.75 | 8.00 | 3.00 |
| Composition [dry-mol %] | | | | | | |
| $N_2$ | 98.8 | 83.9 | 95.3 | 24.8 | 46.1 | — |
| Ar | 1.2 | 0.7 | 0.7 | 21.0 | 38.7 | — |
| $NH_3$ | — | 15.4 | 4 | 54.2 | 15.2 | 100.0 |

The resultant high-concentration ammonia may be directly utilized as a fuel for an ammonia gas turbine or an ammonia fuel cell.

Exemplary embodiments in which the ammonia separation membrane is combined with the ammonia production process utilizing an electrolysis method have been described, but the present invention exhibits the same effects even when ammonia PSA is adopted instead of the ammonia separation membrane as illustrated in FIG. 7 and FIG. 9 and shown in Tables 5 to 7.

A configuration of FIG. 7 includes a step of subjecting the unliquefied gas from the ammonia liquefaction device to the treatment using ammonia PSA again. When the unliquefied gas is subjected to the treatment again as a raw material gas, the production amount of ammonia can be increased.

As shown in Table 5, the adoption of the process configuration of FIG. 7 provides an effect of reducing consumption power by about 80% and an effect of increasing production of liquid ammonia by about 17% as compared to the related art. This is because, even when an increase in concentration of ammonia in the unliquefied gas is permitted as shown in Table 5, such increase does not affect a loss of product ammonia, and as a result, energy required for the ammonia liquefaction device can be significantly reduced. With such configuration, as described in the exemplary embodiments each using the ammonia separation membrane, the ammonia liquefaction device can be operated without an external cold heat source, and hence a reducing effect on facility cost can be expected.

Illustrated in FIG. 8 is a process configuration in which, in the process configuration of FIG. 7, a purge gas to be discharged to an outside of a system is recycled on a high-concentration ammonia side after treatment using an ammonia PSA so that ammonia in the purge gas is recovered while the impurities, such as argon, are prevented from being condensed.

Illustrated in FIG. 9 is a configuration in which high-concentration ammonia is recovered on a PSA permeation side in which ammonia is allowed to permeate without being adsorbed.

As shown in Table 5, in the embodiment of FIG. 9, power of a recycle compressor is increased, and consumption power per 1 mole of product liquid ammonia is slightly increased. This seems to be because of the following: simultaneously with high-concentration ammonia obtained on the permeation side, a larger amount of argon is distributed on the PSA permeation side and is condensed in the ammonia liquefaction device, and as a result, a large amount of cooling energy is required; and besides, the residual gas is obtained on the permeation side, and as a result, the recycle compressor requires a larger amount of compression power.

TABLE 5

Adoption of ammonia PSA as separation and condensation means

| | | Configuration reference FIG. | | |
|---|---|---|---|---|
| | | FIG. 3 | FIG. 7 | FIG. 9 |
| Comparison in production amount of liquid ammonia | [%] | 100 (BASE) | 116.5 | 115.8 |
| Comparison in consumption Total power | [%] | 100 (BASE) | 21.5 | 50.7 |
| Nitrogen PSA | [%] | 48.4 | 6.3 | 6.8 |
| Ammonia liquefaction device | [%] | 51.6 | 13.1 | 9.3 |
| Recycle compressor | [%] | — | 2.1 | 34.6 |
| Comparison in consumption power per 1 kmol of liquid ammonia | [%] | 100 (BASE) | 18.4 | 43.8 |

TABLE 6

Composition of each stream in FIG. 7 (example of ammonia PSA permeation side)

| Stream name | Nitrogen gas | Generation gas | Residual gas | High-concentration ammonia | Unliquefied gas | Liquid ammonia |
|---|---|---|---|---|---|---|
| Pressure [MPaG] | 1.00 | 0.95 | 0.75 | 0.05 | 8.00 | 3.00 |
| Composition [dry-mol %] | | | | | | |
| $N_2$ | 98.8 | 81.7 | 96.5 | 20.9 | 81.9 | — |
| Ar | 1.2 | 2.8 | 3.3 | 0.7 | 2.8 | — |
| $NH_3$ | — | 15.5 | 0.2 | 78.4 | 15.3 | 100.0 |

TABLE 7

Composition of each stream in FIG. 9 (example of ammonia PSA release side)

| Stream name | Nitrogen gas | Generation gas | Residual gas | High-concentration ammonia | Unliquefied gas | Liquid ammonia |
|---|---|---|---|---|---|---|
| Pressure [MPaG] | 1.00 | 0.95 | 0.05 | 0.75 | 8.00 | 3.00 |
| Composition [dry-mol %] | | | | | | |
| $N_2$ | 98.8 | 83.9 | 96.1 | 4.7 | 15.5 | — |
| Ar | 1.2 | 0.4 | 0.3 | 25.3 | 82.7 | — |
| $NH_3$ | — | 15.7 | 3.6 | 70.0 | 1.8 | 100.0 |

Based on comparison between Table 1 for a liquid ammonia production technology using an ammonia separation membrane and Table 5 for a liquid ammonia production technology using ammonia PSA, the production amount of liquid ammonia is larger in the process using ammonia PSA, and the power required for obtaining 1 kmol of liquid ammonia is more excellent in the process using an ammonia separation membrane. However, in each case, production efficiency can be increased, and also consumption power can be reduced as compared to those in the embodiment of FIG. 3. An application process needs to be determined in consideration of a market price and a power price. When ammonia PSA is adopted, it is preferred to select PSA operation conditions so that high-concentration ammonia is obtained on a release side.

A detail view of a liquid ammonia production process utilizing a proton exchange membrane in an ammonia synthesis method through electrolysis and using an ammonia separation membrane is illustrated in FIG. 10. With regard to the process configuration of FIG. 1, device configurations of main constituent units of the process are illustrated in FIG. 10. In addition, a ratio of consumption power of each of the main constituent units is shown in Table 1 and Table 5. As the ratio, the total consumption power of constituent devices of each of the main constituent units of the process is used.

Figure 11:
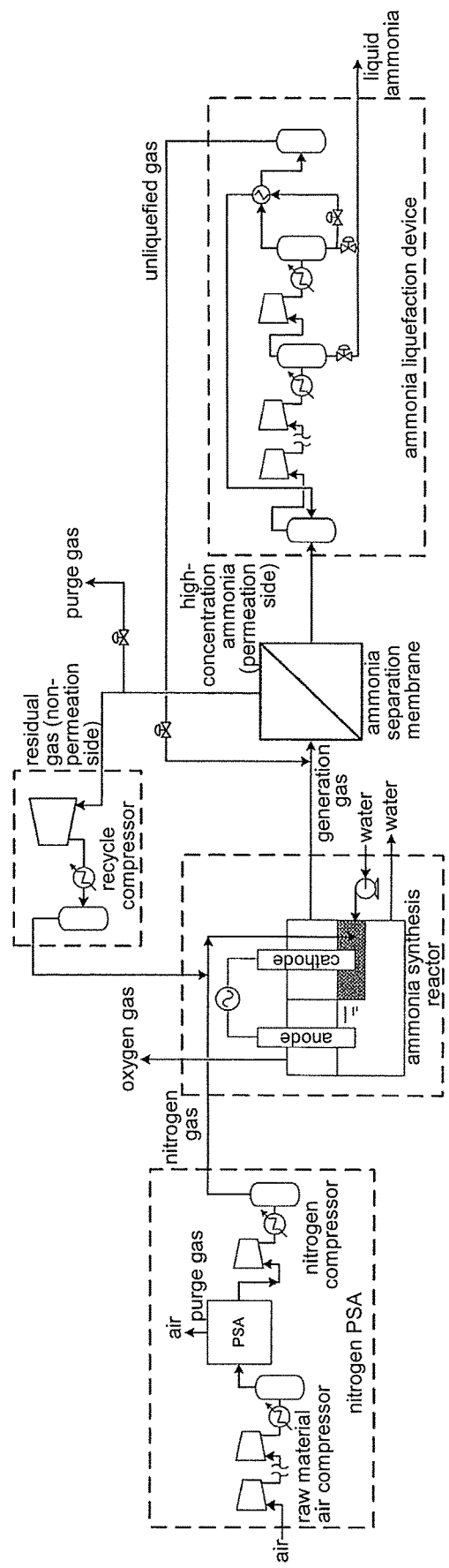
FIG. 11 is a schematic view of one embodiment of the ammonia synthesis process of the present invention.

Similarly, a detail view of a liquid ammonia production process utilizing an anion exchange membrane is illustrated in FIG. 11. The process of FIG. 11 differs from that of FIG. 10 in a water supply position in the ammonia synthesis reactor, but is the same as that in the case of utilizing the proton exchange membrane in the supply of the raw material gas and the generation of the generation gas. Therefore, the present invention can be applied without problems.

The invention claimed is:

1. A high-concentration ammonia production method, comprising:

subjecting a resultant generation gas to treatment using an ammonia separation membrane or an ammonia PSA to separate the generation gas into high-concentration ammonia and a residual gas;

recycling the residual gas as a nitrogen gas raw material of an ammonia synthesis reactor, and liquefying the high-concentration ammonia recovered through the ammonia separation membrane or the ammonia PSA; and subjecting an unliquefied gas separated from liquefied ammonia to the treatment using the ammonia separation membrane or the ammonia PSA again.

2. The high-concentration ammonia production method according to claim 1, further comprising:

discharging, as a purge gas, part of the residual gas to be recycled to an outside of a system to suppress condensation of argon; and mixing at least part of the purge gas to be discharged in the high-concentration ammonia recovered through the ammonia separation membrane or the ammonia PSA.

3. A power generation method, comprising:

combusting high-concentration ammonia obtained by the method of claim 1; and driving a gas turbine by using a resultant gas as a working medium to generate power.

4. A high-concentration ammonia use method, comprising introducing high-concentration ammonia obtained by the method of claim 1 as a fuel for an ammonia fuel cell.

5. A power generation method, comprising:

combusting high-concentration ammonia obtained by the method of claim 2; and driving a gas turbine by using a resultant gas as a working medium to generate power.

6. A high-concentration ammonia use method, comprising introducing high-concentration ammonia obtained by the method of claim 2 as a fuel for an ammonia fuel cell.

* * * * *